(12) United States Patent
Maekawa et al.

(10) Patent No.: US 11,150,626 B2
(45) Date of Patent: Oct. 19, 2021

(54) REFERENCE TEMPERATURE SETTING DEVICE, REFERENCE TEMPERATURE SETTING METHOD, AND REFERENCE TEMPERATURE SETTING PROGRAM

(71) Applicant: FANUC CORPORATION, Yamanashi (JP)

(72) Inventors: Susumu Maekawa, Yamanashi (JP); Hirohide Tsunoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 75 days.

(21) Appl. No.: 16/238,141

(22) Filed: Jan. 2, 2019

(65) Prior Publication Data
US 2019/0235469 A1 Aug. 1, 2019

(30) Foreign Application Priority Data
Jan. 31, 2018 (JP) .............................. JP2018-015632

(51) Int. Cl.
*G05B 19/404* (2006.01)
*G05B 19/401* (2006.01)
*G05B 19/406* (2006.01)

(52) U.S. Cl.
CPC ......... *G05B 19/404* (2013.01); *G05B 19/401* (2013.01); *G05B 19/406* (2013.01);
(Continued)

(58) Field of Classification Search
CPC ... G05B 19/404; G05B 19/401; G05B 19/406
See application file for complete search history.

(56) References Cited

U.S. PATENT DOCUMENTS 5,562,526 A * 10/1996 Yoneda .................. B24B 49/14
451/10
9,956,660 B2 * 5/2018 Koyama ................ B23Q 15/18
(Continued)

FOREIGN PATENT DOCUMENTS

| CN | 1077000 | 1/2002 |
| CN | 103217927 | 7/2013 |

(Continued)

OTHER PUBLICATIONS

Notification of Reasons for Refusal dated Nov. 26, 2019 in corresponding Japanese Patent Application No. 2018-015632.
(Continued)

*Primary Examiner* — Manuel A Rivera Vargas
*Assistant Examiner* — Yaritza H Perez Bermudez
(74) *Attorney, Agent, or Firm* — Wenderoth, Lind & Ponack, L.L.P.

(57) ABSTRACT

To provide a reference temperature setting device, a reference temperature setting method, and a reference temperature setting program capable of setting an appropriate reference temperature for thermal displacement compensation. A reference temperature setting device comprises: an acquisition unit that acquires measured values from multiple temperature sensors installed on a machine; and a determination unit that determines setting timing for a reference temperature for thermal displacement compensation to coincide with a point in time when the measured values satisfy a predetermined condition.

11 Claims, 3 Drawing Sheets

(52) U.S. Cl.
CPC .............. *G05B 2219/37428* (2013.01); *G05B 2219/49102* (2013.01); *G05B 2219/49219* (2013.01)

(56) References Cited

U.S. PATENT DOCUMENTS

| | | | | |
|---|---|---|---|---|
| 10,592,824 | B2* | 3/2020 | Watanabe | G06N 20/00 |
| 2002/0038189 | A1* | 3/2002 | Mizuguchi | B23Q 15/18 |
| | | | | 702/94 |
| 2005/0097946 | A1* | 5/2005 | Wakahara | F01P 11/14 |
| | | | | 73/114.71 |
| 2005/0224019 | A1* | 10/2005 | Kim | F01P 5/14 |
| | | | | 123/41.1 |
| 2007/0029396 | A1* | 2/2007 | Braun | F01P 7/167 |
| | | | | 236/34.5 |
| 2008/0215178 | A1* | 9/2008 | Senda | B23Q 15/18 |
| | | | | 700/175 |
| 2013/0223946 | A1* | 8/2013 | Yamamoto | B23Q 15/18 |
| | | | | 409/80 |
| 2015/0276633 | A1* | 10/2015 | Koyama | G01M 99/002 |
| | | | | 702/94 |
| 2015/0283636 | A1* | 10/2015 | Yoshizaki | B23H 7/02 |
| | | | | 700/162 |
| 2018/0117693 | A1* | 5/2018 | Hada | G05B 19/182 |
| 2018/0122623 | A1* | 5/2018 | Hada | H01J 37/32724 |
| 2018/0181103 | A1* | 6/2018 | Mizoguchi | B23Q 11/0007 |
| 2019/0235469 | A1* | 8/2019 | Maekawa | G05B 19/404 |
| 2019/0235472 | A1* | 8/2019 | Maekawa | G05B 19/404 |

FOREIGN PATENT DOCUMENTS

| | | | |
|---|---|---|---|
| CN | 103926874 | | 7/2014 |
| CN | 105563232 | | 5/2016 |
| CN | 106371404 | | 2/2017 |
| CN | 106488828 | | 3/2017 |
| JP | 7-47257 | | 5/1995 |
| JP | 11-58179 | | 3/1999 |
| JP | H1158179 A | * | 3/1999 |
| JP | 2004-42260 | | 2/2004 |
| JP | 2004042260 A | * | 2/2004 |
| JP | 2007-21721 | | 2/2007 |
| JP | 2007-167966 | | 7/2007 |
| JP | 2007167966 A | * | 7/2007 |
| JP | 2009-142919 | | 7/2009 |
| JP | 2013-188810 | | 9/2013 |

OTHER PUBLICATIONS

Office Action dated Aug. 17, 2020 in Chinese Patent Application No. 201910035804.8.

* cited by examiner

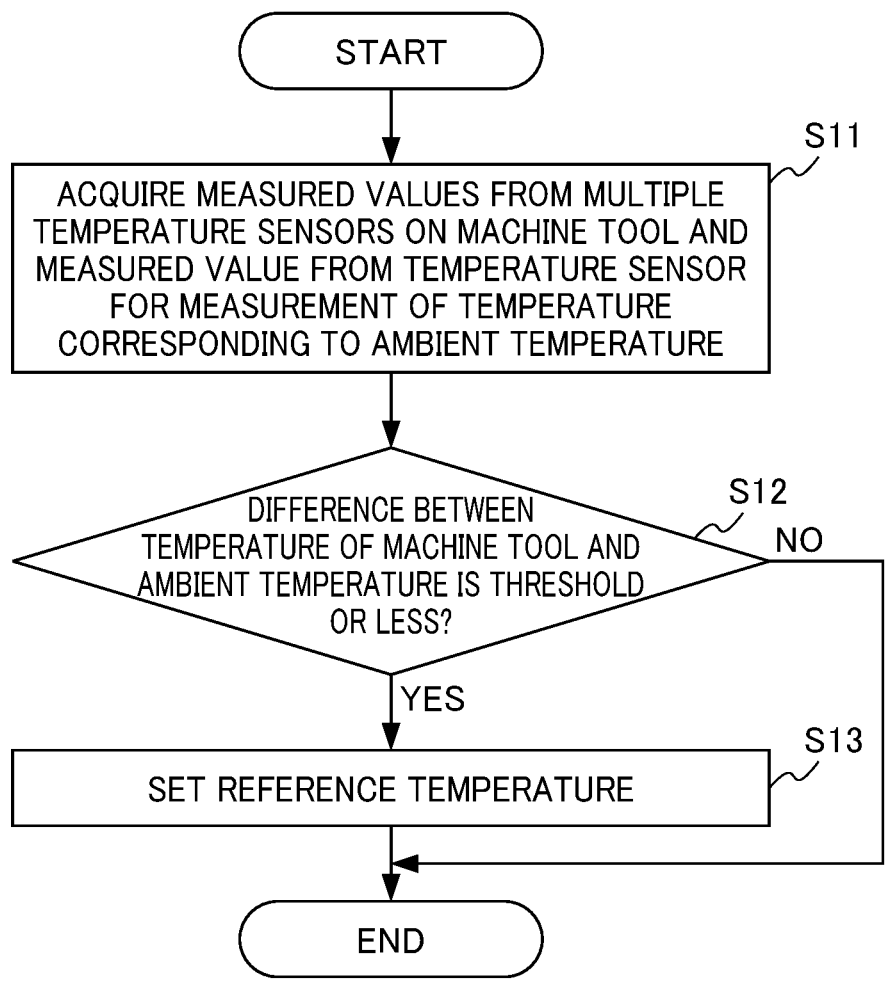

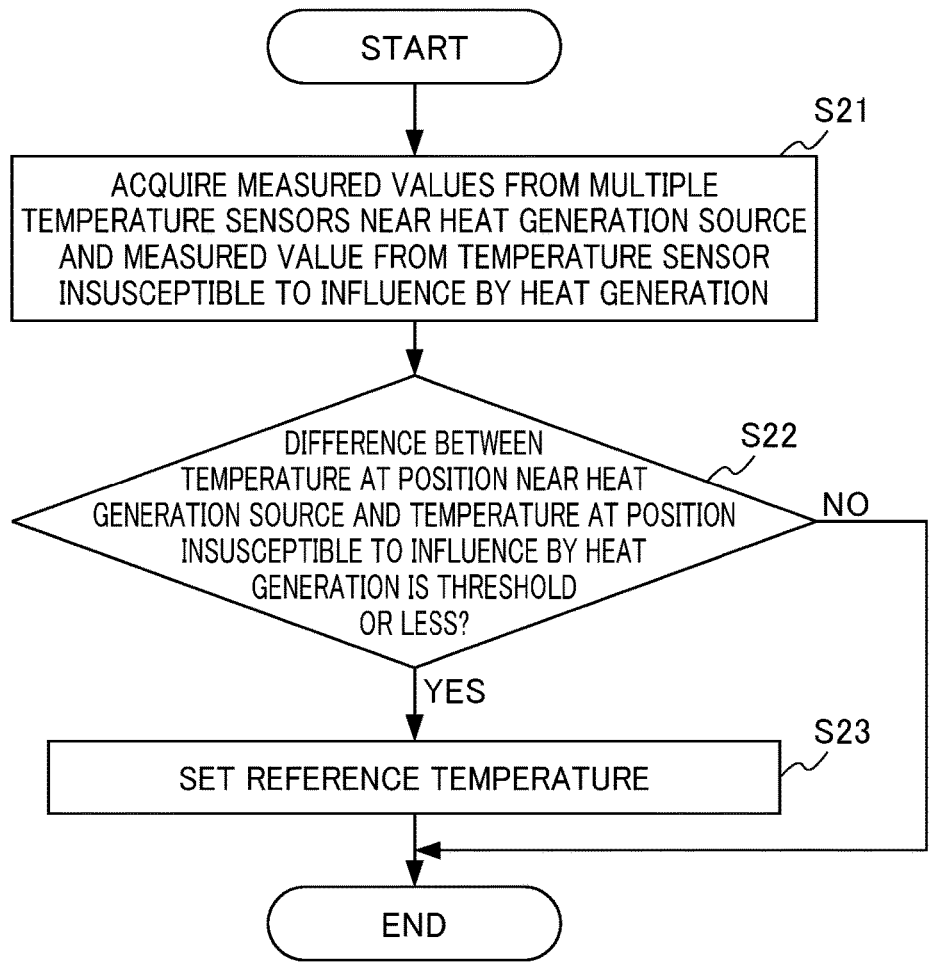

REFERENCE TEMPERATURE SETTING DEVICE, REFERENCE TEMPERATURE SETTING METHOD, AND REFERENCE TEMPERATURE SETTING PROGRAM

This application is based on and claims the benefit of priority from Japanese Patent Application No. 2018-015632, filed on 31 Jan. 2018, the content of which is incorporated herein by reference.

BACKGROUND OF THE INVENTION

Field of the Invention

The present invention relates to a device, a method, and a program for setting a reference temperature used for compensating for thermal displacement of a machine tool.

Related Art

According to a technique conventionally suggested for compensating for thermal displacement of a machine tool caused by heat generation, the state of the machine is monitored using multiple sensors and the thermal displacement is estimated. According to this technique, a reference temperature and a reference position are set, and the amount of thermal displacement from the reference position is estimated based on temperature change relative to the reference temperature.

This technique requires setting of the reference temperature and the reference position. It is appropriate that these settings be made to coincide with timing of when the machine body is adapted to an external environment and is in a stable state. A way in which a temperature changes and a way in which displacement occurs differ between a case where heat is generated from a state in which a machine does not generate heat and a case where heat is generated further from a state in which the machine already generates heat, for example. Hence, if timing for setting a reference is inappropriate, for example, if the reference is set when the machine generates heat, it becomes impossible to estimate the amount of thermal displacement correctly.

The following techniques have been suggested as those of setting a reference temperature: a technique of setting a temperature at the time of power-on as a reference temperature (see patent documents 1 and 2, for example); a technique of setting a temperature at the time of placement of a fixture as a reference temperature (see patent document 3, for example); and a technique of setting the temperature of a member belonging to components of a machine tool and having a large temperature time constant as a reference temperature (see patent document 4, for example).

Patent Document 1: Japanese Examined Patent Application Publication No. H07-47257
Patent Document 2: Japanese Unexamined Patent Application, Publication No. 2004-42260
Patent Document 3: Japanese Unexamined Patent Application, Publication No. 2007-167966
Patent Document 4: Japanese Unexamined Patent Application, Publication No. 2009-142919

SUMMARY OF THE INVENTION

According to the conventional techniques, however, displacement of a machine has been made unstable in some cases by change in an ambient temperature occurring before a point in time coinciding with setting timing. Additionally, if a member having a large temperature time constant and being at a relatively stable temperature is used as a reference, reference temperatures of all sensors become constant independently of locations, individual differences, acquisition methods, etc. This has caused differences from actual temperatures. For the reasons given above, it has been difficult to set an appropriate reference temperature.

The present invention is intended to provide a reference temperature setting device, a reference temperature setting method, and a reference temperature setting program capable of setting an appropriate reference temperature for thermal displacement compensation.

(1) A reference temperature setting device according to the present invention (reference temperature setting device 1 described later, for example) comprises: an acquisition unit (acquisition unit 11 described later, for example) that acquires measured values from multiple temperature sensors installed on a machine; and a determination unit (determination unit 12 described later, for example) that determines setting timing for a reference temperature for thermal displacement compensation to coincide with a point in time when the measured values satisfy a predetermined condition.

(2) In the reference temperature setting device described in (1), the determination unit may determine the setting timing to coincide with a point in time when a maximum difference between the measured values is a threshold or less.

(3) In the reference temperature setting device described in (1), the acquisition unit may acquire a measured value from a temperature sensor for measurement of a temperature corresponding to an ambient temperature, and the determination unit may determine the setting timing to coincide with a point in time when a maximum difference between the measured value from the temperature sensor for measurement of a temperature corresponding to an ambient temperature and the measured values from the multiple temperature sensors is a threshold or less.

(4) In the reference temperature setting device described in (1), the acquisition unit may acquire a measured value from a predetermined temperature sensor installed at a position insusceptible to influence by heat generated, and the determination unit may determine the setting timing to coincide with a point in time when a maximum difference between the measured value from the predetermined temperature sensor and the measured values from the multiple temperature sensors is a threshold or less.

(5) In the reference temperature setting device described in any one of (1) to (4), the acquisition unit may acquire measured values from predetermined temperature sensors installed near a heat generation source at the machine as the measured values from the multiple temperature sensors.

(6) The reference temperature setting device described in any one of (1) to (5) may comprise a setting unit (setting unit 13 described later, for example) that sets the measured values from the multiple temperature sensors as reference temperatures of the multiple temperature sensors to coincide with the setting timing.

(7) The reference temperature setting device described in any one of (1) to (5) may comprise a setting unit (setting unit 13 described later, for example) that sets a reference temperature stored in advance in association with a statistic value about the measured values from the multiple temperature sensors to coincide with the setting timing.

(8) In the reference temperature setting device described in (6) or (7), the setting timing may be determined and the reference temperature may be set at a first machine, and the setting unit may set the same reference temperature at a second machine different from the first machine.

(9) A reference temperature setting method according to the present invention comprises the following steps to be performed by a computer: an acquisition step of acquiring measured values from multiple temperature sensors installed on a machine; and a determination step of determining setting timing for a reference temperature for thermal displacement compensation to coincide with a point in time when the measured values satisfy a predetermined condition.

(10) A reference temperature setting program according to the present invention causes a computer to perform: an acquisition step of acquiring measured values from multiple temperature sensors installed on a machine; and a determination step of determining setting timing for a reference temperature for thermal displacement compensation to coincide with a point in time when the measured values satisfy a predetermined condition.

According to the present invention, an appropriate reference temperature for thermal displacement compensation can be set.

BRIEF DESCRIPTION OF THE DRAWINGS

FIG. 3 is a flowchart showing a procedure (B) of determining setting timing for a reference temperature according to the embodiment;

FIG. 4 is a flowchart showing a procedure (C) of determining setting timing for a reference temperature according to the embodiment; and FIG. 5 shows an example of a reference temperature table according to the embodiment.

DETAILED DESCRIPTION OF THE INVENTION

Figure 1:
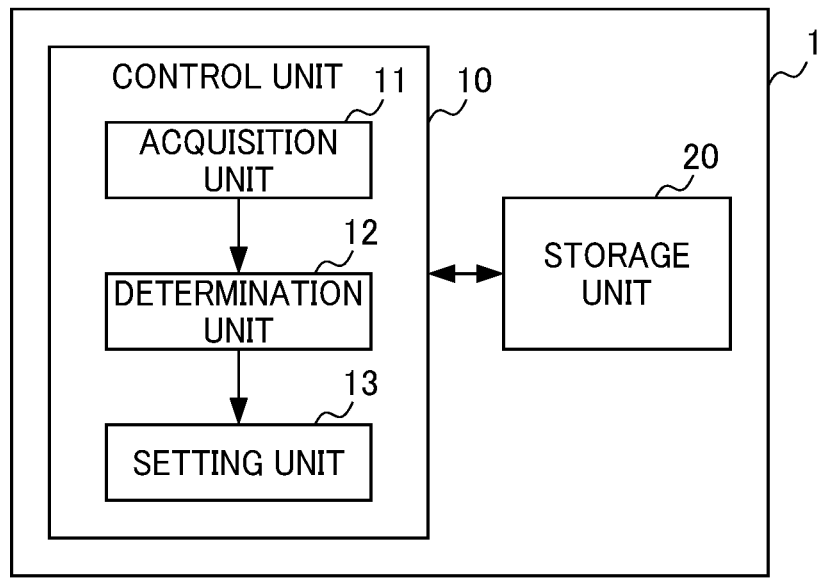
FIG. 1 is a block diagram showing the functional configuration of a reference temperature setting device according to an embodiment.

An example of an embodiment of the present invention will be described below. FIG. 1 is a block diagram showing the functional configuration of a reference temperature setting device 1 according to an embodiment. The reference temperature setting device 1 may be a built-in device functioning as a control unit (computerized numerical controller (CNC)) for each machine tool. Alternatively, the reference temperature setting device 1 may be configured as an external device or as a server device functioning through a network.

The reference temperature setting device 1 described in this embodiment is an information processor (computer) that outputs a result of operation based on inputs from various types of interfaces. The reference temperature setting device 1 includes a control unit 10 that executes software (reference temperature setting program) stored in a storage unit 20 to function as an acquisition unit 11, a determination unit 12, and a setting unit 13.

The acquisition unit 11 acquires measured values from multiple temperature sensors installed on each machine tool. The acquisition unit 11 may also acquire a measured value from a temperature sensor for measurement of a temperature corresponding to an ambient temperature installed on a machine tool or external to the machine tool. The temperature sensor for measurement of a temperature corresponding to an ambient temperature is not always required to be installed on the body of a machine tool but an external temperature sensor may be shared between multiple machine tools. The acquisition unit 11 may acquire a measured value from a predetermined temperature sensor installed at a position insusceptible to influence by heat generated by the motion of a machine tool and insusceptible to influence by a coolant.

A part to be influenced by heat generation may include the following parts, for example.

A part to be influenced by heat generated from a motor: A part near a spindle motor and a part near a motor of each axis are to be influenced by thermal conduction occurring in response to the motion of each motor as a heat generation source.

A part to be influenced by heat generated by sliding motion: The motion of each feed axis causes the sliding motion of a ball screw or a linear guide, for example. At this time, heat is generated and parts near these members are influenced by thermal conduction.

A part to be influenced by a coolant includes a part to be directly exposed to a coolant and a part to be exposed to splashes of the coolant in a machining space under a cover, for example. Further, a space filled with the mist of the coolant is influenced by the temperature of the coolant.

Specifically, a part to be selected as a part insusceptible to influence by heat generation and a coolant is a part separated sufficiently from a motor or a part to make sliding motion at which thermal conduction from a heat generation source is negligible, and located outside a space to contact the coolant.

The determination unit 12 determines setting timing for a reference temperature for thermal displacement compensation to coincide with a point in time when measured values from multiple temperature sensors satisfy a predetermined condition.

The setting unit 13 sets a reference temperature for thermal displacement compensation at a point in time coinciding with the setting timing for the reference temperature determined by the determination unit 12. The setting unit 13 is not always required to set a reference temperature at each point in time coinciding with the setting timing but may reset a reference temperature at a frequency set in advance, such as once a day or once in a season, for example.

More specifically, the determination unit 12 may determine the setting timing for a reference temperature by taking any one of the following procedures (A) to (C).

(A) The determination unit 12 compares measured values from multiple temperature sensors acquired at a given point in time. The determination unit 12 determines setting timing for a reference temperature to coincide with a point in time when a maximum difference between the measured values is a threshold or less.

If thermal displacement resulting from the motion of a machine tool does not occur so a surrounding temperature and the temperature of a machine body do not largely differ, measured values from all the temperature sensors become comparable. Thus, if a difference between the measured values from all the temperature sensors is the threshold or less, the machine body can be determined to be adapted to an external environment and to be in a stable state. The multiple temperature sensors may include a temperature sensor for measurement of a temperature corresponding to an ambient temperature.

It is unlikely that the temperatures of various parts of the machine body will not be stabilized simultaneously in a manner that depends on actual circumstances in which the machine tool is used in terms of various external environments such as temperature change in day, turning on/off or adjusting of an air conditioner, and opening/closing of a shutter, or influence by the use of a coolant, for example.

For this reason, the multiple temperature sensors for acquisition of measured values may be limited to temperature sensors near a heat generation source. In the absence of heat generation near a heat generation source, such as a motor or a part to make sliding motion, all these temperature sensors provide measured values comparable to each other. A part near the heat generation source is subjected to large temperature change, so that the presence or absence of heat generation can be determined easily at this part. Thus, if a difference between measured values from the multiple temperature sensors installed near the heat generation source is the threshold or less, the determination unit 12 can determine the absence of heat generation reliably. In many cases, a heat generation source such as a spindle is covered by the exterior of the machine body, so that it is not largely influenced by an external environment, such as direct exposure to wind. This allows the determination unit 12 to determine the absence of heat generation resulting from the motion of the machine tool while suppressing accuracy reduction due to disturbance such as environmental change, compared to making a determination based on a difference between measured values from all sensors installed at various parts of the machine body.

Figure 2:
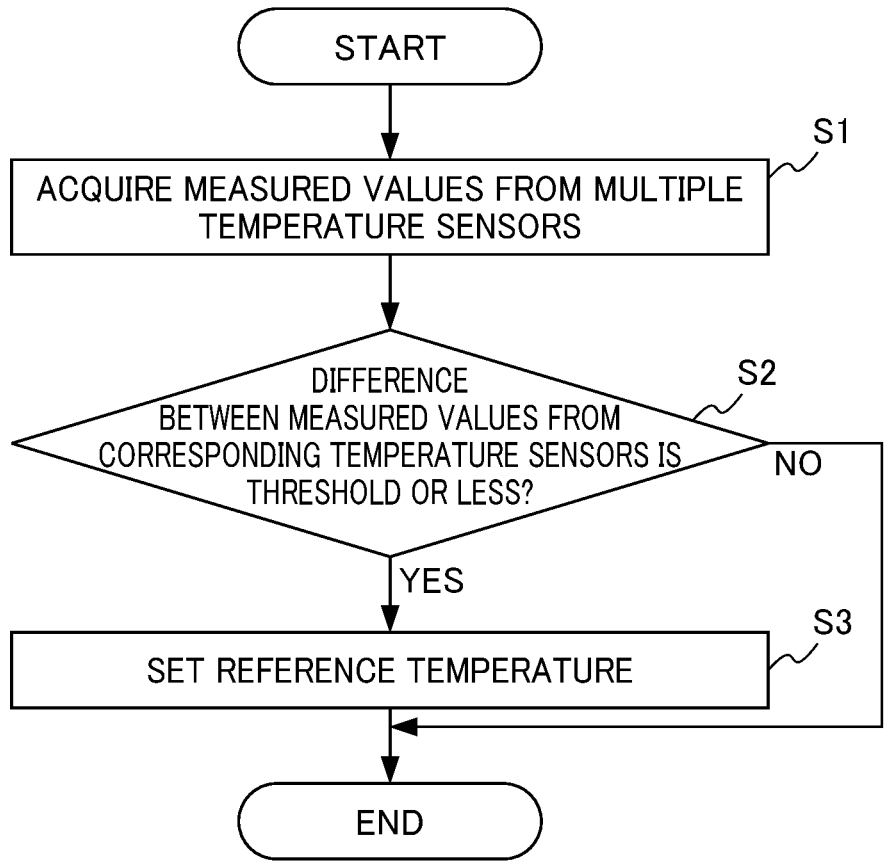
FIG. 2 is a flowchart showing a procedure (A) of determining setting timing for a reference temperature according to the embodiment.

FIG. 2 is a flowchart showing a procedure (A) of determining setting timing for a reference temperature according to this embodiment. This procedure may be performed repeatedly in a predetermined cycle (one second, one minute, or ten minutes, for example), or may be performed in response to power-on or start of machining as a trigger.

In step S1, the acquisition unit 11 acquires measured values from multiple temperature sensors. In step S2, the determination unit 12 determines whether a difference between the measured values from the corresponding temperature sensors is a threshold or less. If the determination is YES, the procedure goes to step S3. If the determination is NO, the procedure is finished. In step S3, the setting unit 13 sets a reference temperature.

(B) The determination unit 12 determines setting timing for a reference temperature to coincide with a point in time when a maximum difference between a measured value from a temperature sensor for measurement of a temperature corresponding to an ambient temperature and measured values from multiple temperature sensors is a threshold or less.

When the machine body of a machine tool is adapted to an external environment and is in a stable state, a measured value from the temperature sensor for measurement of a temperature corresponding to an ambient temperature and measured values from temperature sensors at various parts of the machine body become comparable. Thus, if a difference between the ambient temperature and the measured values from the temperature sensors at various parts of the machine body is the threshold or less, the machine body can be determined to be adapted to an external environment and to be in a stable state. Like in the case of the determination procedure (A), the multiple temperature sensors may be limited to temperature sensors near a heat generation source for performing the determination procedure (B).

FIG. 3 is a flowchart showing the procedure (B) of determining setting timing for a reference temperature according to this embodiment. Like the determination procedure (A), this procedure may be performed repeatedly in a predetermined cycle, or may be performed in response to fulfillment of a particular condition as a trigger.

In step S11, the acquisition unit 11 acquires measured values from multiple temperature sensors installed on a machine tool and a measured value from a temperature sensor for measurement of a temperature corresponding to an ambient temperature. In step S12, the determination unit 12 determines whether a difference between the measured values from the corresponding temperature sensors installed on the machine tool and the ambient temperature is a threshold or less. If the determination is YES, the procedure goes to step S13. If the determination is NO, the procedure is finished. In step S13, the setting unit 13 sets a reference temperature.

(C) The determination unit 12 determines setting timing for a reference temperature to coincide with a point in time when a maximum difference between a measured value from a predetermined temperature sensor installed at a position insusceptible to influence by heat generation and a coolant and measured values from multiple temperature sensors installed on a machine tool is a threshold or less.

In this case, the multiple temperature sensors may be limited to temperature sensors near a heat generation source. These temperature sensors near the heat generation source are covered by sheet metal, for example, so that they are insusceptible to influence by an external factor other than heat generation, such as a coolant. In the absence of heat generation in the machine tool, measured values from the temperature sensors near the heat generation source and measured values from the temperature sensors separated sufficiently from the heat generation source and insusceptible to influence by heat generation become comparable. Thus, if a difference between these measured values is the threshold or less, it can be determined that there is no displacement due to heat generation.

FIG. 4 is a flowchart showing the procedure (C) of determining setting timing for a reference temperature according to this embodiment. Like the determination procedure (A), this procedure may be performed repeatedly in a predetermined cycle, or may be performed in response to fulfillment of a particular condition as a trigger.

In step S21, the acquisition unit 11 acquires respective measured values from multiple temperature sensors installed on a machine tool, including multiple temperature sensors near a heat generation source and a temperature sensor insusceptible to influence by heat generation. In step S22, the determination unit 12 determines whether a difference between the measured values from the temperature sensors near the heat generation source and the measured value from the temperature sensor insusceptible to influence by heat generation is a threshold or less. If the determination is YES, the procedure goes to step S23. If the determination is NO, the procedure is finished. In step S23, the setting unit 13 sets a reference temperature.

A method of setting a reference temperature executed by the setting unit 13 will be described next. The setting unit 13 may set a reference temperature by executing a setting method (1) or (2) as follows, for example.

(1) The setting unit 13 sets each of measured values from multiple temperature sensors acquired as a reference temperature of the corresponding temperature sensors to coincide with determined setting timing.

(2) The setting unit 13 sets a reference temperature stored in advance in association with a statistic value about measured values from multiple temperature sensors. More specifically, a reference temperature table is stored in the storage unit of the reference temperature setting device 1 or in a storage unit (memory) of a machine tool, for example. The setting unit 13 reads a reference temperature of each temperature sensor from the table, and sets the read reference temperature.

FIG. 5 shows an example of the reference temperature table according to this embodiment. First, the setting unit 13 determines a standard temperature. The standard temperature is a measured value from a particular temperature sensor such as a temperature sensor for measurement of a temperature corresponding to an ambient temperature or one of temperature sensors installed on a machine body, or an average of measured values from multiple temperature sensors, for example.

Next, the setting unit 13 extracts a reference temperature of each sensor number stored in association with the standard temperature. If an ambient temperature is determined as the standard temperature, and if the measured ambient temperature is 0° C., for example, a fifth reference temperature of 8° C. associated with the standard temperature of 0° C. is set as a reference temperature of a sensor 5. If the reference temperature table does not contain the determined standard temperature, the setting unit 13 may calculate an associated reference temperature by using an appropriate way such as linear interpolation.

When the machine tool is powered on, a motor may be excited and generate heat, for example. The heat generated from the motor increases a surrounding temperature. Hence, even if the machine does not make motion and is in a stable state, a measured value from a temperature sensor installed around the motor does not agree with an ambient temperature or a measured value from a different temperature sensor. For such a part where a temperature is changed only by turning on or off a power supply, a value stored in advance as a value expected to be achieved after stabilization of a measured value from a temperature sensor can be set as a reference temperature without the need to wait for a period until the stabilization. Even if setting timing for a reference temperature is not optimum, reference temperatures of corresponding temperature sensors are set appropriately relative to each other. This allows the reference temperature setting device 1 to suppress degradation of accuracy in estimation of thermal displacement.

According to this embodiment, the reference temperature setting device 1 determines that a machine body is in a stable state based on measured values from multiple temperature sensors installed on a machine tool, and determines setting timing for a reference temperature for thermal displacement compensation. This allows the reference temperature setting device 1 to appropriately determine that the machine body of the machine tool is adapted to an external environment and is in a stable state based on the measured values from the multiple temperature sensors. As a result, the reference temperature setting device 1 becomes capable of setting an appropriate reference temperature for thermal displacement compensation.

The reference temperature setting device 1 determines setting timing for a reference temperature to coincide with a point in time when a difference between measured values from multiple temperature sensors does not exceed a threshold. This allows the reference temperature setting device 1 to appropriately determine that a machine tool is adapted to an external environment and stabilized at a constant temperature based on a state in which measured values from temperature sensors installed at multiple positions are comparable.

The reference temperature setting device 1 determines setting timing for a reference temperature to coincide with a point in time when a difference between a measured value from a temperature sensor for measurement of a temperature corresponding to an ambient temperature and measured values from multiple temperature sensors installed on a machine tool does not exceed a threshold. This allows the reference temperature setting device 1 to appropriately determine that the machine tool is adapted to an ambient temperature and stabilized at a temperature comparable to the ambient temperature.

The reference temperature setting device 1 determines setting timing for a reference temperature to coincide with a point in time when a difference between a measured value from a temperature sensor installed at a position insusceptible to influence by heat generation and measured values from multiple temperature sensors installed on a machine tool does not exceed a threshold. This allows the reference temperature setting device 1 to appropriately determine that the machine tool is adapted to an external environment and stabilized at a constant temperature based on a state in which the machine tool in its entirety, including a part near a heat generation source, is at a comparable temperature to the position insusceptible to influence by heat generation.

The reference temperature setting device 1 observes a position subjected to large temperature change resulting from heat generation using a measured value from a temperature sensor installed at a position near a heat generation source. This allows the reference temperature setting device 1 to determine that a machine tool in its entirety is adapted to an external environment and stabilized at a constant temperature in a simple way with a comparable degree of accuracy.

The reference temperature setting device 1 sets a measured value acquired from a temperature sensor having been used for determining timing for setting a reference temperature for thermal displacement compensation as it is as a reference temperature. This allows the reference temperature setting device 1 to easily set an appropriate reference temperature for thermal displacement compensation.

The reference temperature setting device 1 sets a reference temperature stored in advance in association with a standard temperature as a statistic value about measured values from multiple temperature sensors. By doing so, if temperatures in a stable state fluctuate from the standard temperature, the reference temperature setting device 1 becomes capable of setting appropriate reference temperatures. Further, even if setting timing for a reference temperature is not optimum, reference temperatures of corresponding temperature sensors are set appropriately relative to each other. This makes it possible to suppress degradation of accuracy in estimation of thermal displacement.

Although the embodiment of the present invention has been described so far, the present invention is not limited to the above-described embodiment. The effects described in the embodiment are merely a list of the most preferred effects resulting from the present invention. Effects achieved by the present invention are not limited to those described in the embodiment.

In the foregoing embodiment, the reference temperature setting device 1 determines that a machine body does not generate heat and is in a stable state using measured values from temperature sensors installed on a machine tool. However, this is not the only case. There is a known technique of estimating the amount of generated heat or the amount of thermal displacement without using a temperature sensor. According to techniques suggested in documents A and B listed below, for example, by using parameters including the rotation number of a spindle, the move speed of the spindle, a load on a motor, etc., and by using a calculation formula employing appropriately set coefficients including a heat dissipation coefficient, a heat generation coefficient, a thermal conduction coefficient, etc., the amount of displacement resulting from heat generation is estimated without using a temperature sensor. When the amount of heat generation or the amount of displacement estimated by these techniques is a threshold or less and is sufficiently small, the reference temperature setting device 1 can determine that a machine body does not generate heat and is in a stable state. In this case, the reference temperature setting device 1 may determine setting timing for a reference temperature to coincide with this point in time. These techniques are used effectively at a part such as a spindle not intended for installation of a temperature sensor in many cases. In this case, the reference temperature setting device 1 can set a reference temperature appropriately without being influenced by an external factor such as an ambient temperature or discharge of a coolant, for example.

Document A: Japanese Unexamined Patent Application, Publication No. 2002-18677

Document B: Japanese Unexamined Patent Application, Publication No. 2015-199168

A reference temperature set at one machine tool may also be set at a different machine tool through a network by the setting unit 13, and the same reference temperature may be shared between multiple machine tools. A reference temperature is set to coincide with timing of when displacement resulting from heat generation at a machine body does not occur. Hence, a machine tool is required to be stabilized by being stopped for a long period of time. Sharing a reference temperature between multiple machine tools in the same environment means that setting timing for a reference temperature is required to be met at only one of the machine tools. Thus, the foregoing procedures for setting a reference temperature are not required to be performed at each of the other machine tools. This can save time required to stop the other machine tools and bring these machine tools to a stable state.

A reference temperature setting method executed by the reference temperature setting device 1 is realized by software. To realize the reference temperature setting method by software, programs constituting the software are installed on a computer. These programs may be stored in a removable medium and then distributed to a user. Alternatively, these programs may be distributed by being downloaded onto a computer of the user through a network.

EXPLANATION OF REFERENCE NUMERALS

1 Reference temperature setting device
10 Control unit
11 Acquisition unit
12 Determination unit
13 Setting unit
20 Storage unit

What is claimed is:

1. A reference temperature setting device comprising:
an acquisition unit that acquires measured values from multiple temperature sensors installed on a machine; and
a determination unit that determines setting timing for a reference temperature for thermal displacement compensation to coincide with a point in time when the determination unit determines that the measured values from the multiple temperature sensors satisfy a predetermined condition, the setting timing being a point in time at which the reference temperature is set,
wherein the determination unit determines that the measured values from the multiple temperature sensors satisfy the predetermined condition based on a comparison between a threshold and a difference, the difference being calculated by the determination unit based on a comparison using the measured values.

2. The reference temperature setting device according to claim 1, wherein
the difference calculated by the determination unit is a maximum difference between the measured values, and
the determination unit determines that the measured values from the multiple temperature sensors satisfy the predetermined condition when the maximum difference between the measured values is the threshold or less.

3. The reference temperature setting device according to claim 1, wherein
the acquisition unit acquires a measured value from a temperature sensor for measurement of a temperature corresponding to an ambient temperature,
the difference calculated by the determination unit is a maximum difference between the measured value from the temperature sensor for measurement of a temperature corresponding to an ambient temperature and the measured values from the multiple temperature sensors, and
the determination unit determines that the measured values from the multiple temperature sensors satisfy the predetermined condition when the maximum difference between the measured value from the temperature sensor for measurement of a temperature corresponding to an ambient temperature and the measured values from the multiple temperature sensors is the threshold or less.

4. The reference temperature setting device according to claim 1, wherein
the acquisition unit acquires a measured value from a predetermined temperature sensor installed at a position insusceptible to influence by heat generated,
the difference calculated by the determination unit is a maximum difference between the measured value from the predetermined temperature sensor and the measured values from the multiple temperature sensors, and
the determination unit determines that the measured values from the multiple temperature sensors satisfy the predetermined condition when the maximum difference between the measured value from the predetermined temperature sensor and the measured values from the multiple temperature sensors is the threshold or less.

5. The reference temperature setting device according to claim 1, wherein
the acquisition unit acquires measured values from predetermined temperature sensors installed near a heat generation source of the machine as the multiple temperature sensors.

6. The reference temperature setting device according to claim 1, comprising
a setting unit that sets the measured values from the multiple temperature sensors as reference temperatures of the multiple temperature sensors to coincide with the setting timing.

7. The reference temperature setting device according to claim 1, comprising
a setting unit that sets a reference temperature stored in advance in association with a statistic value about the measured values from the multiple temperature sensors to coincide with the setting timing.

8. The reference temperature setting device according to claim 6, wherein
the setting timing is determined and the reference temperature is set at a first machine, and the setting unit sets the same reference temperature at a second machine different from the first machine.

9. A reference temperature setting method comprising the following steps to be performed by a computer:
an acquisition step of acquiring measured values from multiple temperature sensors installed on a machine;
a calculation step of calculating a difference based on a comparison using the measured values; and
a determination step of determining setting timing for a reference temperature for thermal displacement compensation to coincide with a point in time when determining that the measured values from the multiple temperature sensors satisfy a predetermined condition, the setting timing being a point in time at which the reference temperature is set,
wherein the measured values from the multiple temperature sensors are determined to satisfy the predetermined condition based on a comparison between a threshold and the difference calculated in said calculation step.

10. A non-transitory computer-readable medium storing a reference temperature setting program for causing a computer to perform:
an acquisition step of acquiring measured values from multiple temperature sensors installed on a machine;
a calculation step of calculating a difference based on a comparison using the measured values; and
a determination step of determining setting timing for a reference temperature for thermal displacement compensation to coincide with a point in time when determining that the measured values from the multiple temperature sensors satisfy a predetermined condition, the setting timing being a point in time at which the reference temperature is set,
wherein the measured values from the multiple temperature sensors are determined to satisfy the predetermined condition based on a comparison between a threshold and the difference calculated in said calculation step.

11. The reference temperature setting device according to claim 7, wherein
the setting timing is determined and the reference temperature is set at a first machine, and the setting unit sets the same reference temperature at a second machine different from the first machine.

* * * * *